Feb. 26, 1963 N. E. STRÖMBERG ETAL 3,078,633
WRAPPER FOLDING APPARATUS
Filed Dec. 1, 1960 9 Sheets-Sheet 1

Feb. 26, 1963   N. E. STRÖMBERG ETAL   3,078,633
WRAPPER FOLDING APPARATUS
Filed Dec. 1, 1960   9 Sheets-Sheet 3

Feb. 26, 1963 N. E. STRÖMBERG ETAL 3,078,633
WRAPPER FOLDING APPARATUS
Filed Dec. 1, 1960 9 Sheets-Sheet 6

Inventors
Nils Erik Stromberg,
Gustav Jorfeldt
by Sommers & Young
Attorneys

United States Patent Office 3,078,633
Patented Feb. 26, 1963

3,078,633
WRAPPER FOLDING APPARATUS
Nils Erik Strömberg, Sveavagen 48, Sundsvall, Sweden, and Gustav Jorfeldt, Vastergatan 31, Skonsberg, Sweden
Filed Dec. 1, 1960, Ser. No. 73,119
Claims priority, application Sweden Feb. 19, 1960
5 Claims. (Cl. 53—378)

The present invention relates to a folding apparatus for use as the folding unit of a machinery for applying wrappers to pulp bales or bundles of similar form, hereinafter referred to as bales.

An object of the invention is to provide such a folding unit which permits the use as wrapping material of sheets of pulp or sheets of a similar consistency making them difficult to fold by hand. A condition for allowing the use of the folding unit according to the invention is that the bales before reaching the folding unit are partially wrapped by previously folding two wrapper sheets around the bale so as to cover four adjacent surfaces thereof and project by their tubular ends from the remaining or end surfaces of the bale, and securing them to the bale while in this sate by suitable tying means, such as baling wires or steel bands.

The folding unit has for its object to fold said projecting ends of the wrapper sheets inwardly so as to cover said end surfaces of the bale before the bale is transmitted to the binding unit of the machinery, where tying means are applied to the bale in planes at right angles to the planes of the previously applied tying means.

The folding unit according to the invention comprises, in part, a pair of folding heads supported by a common frame on a level above a bale conveying path on opposite sides thereof, said folding heads having means for folding the side and top portions of the projecting tubular ends of the wrapper and, in part, two carriages positioned on opposite sides of said path on a level therewith, said carriages having means for folding the bottom portions of the projecting ends of the wrapper and being movable towards and away from said path for accomplishing the operation of their folding means.

In addition to separate members for folding the side and top portions of the wrapper ends the folding heads are furnished with means for firmly holding the bale in place during the folding process.

In order to adjust a bale as moved on the conveying path towards the folding unit with its tubular ends facing forwardly and rearwardly in the longitudinal direction of the path, into proper position for allowing the performance of the folding operations, there is provided in the conveying path a vertically adjustable turn-table, by means of which the bale may be raised sufficiently clear of the conveying path to be turned into a position in which the tubular ends of the wrapper project to the sides of the conveying path, that is to say, with the longitudinal axis of the open ended wrapper extending at right angles to the longitudinal direction of the conveying path. In this position the bale will be held until the folding of the tubular wrapper ends is completed. After the folding process is completed the bale will be lowered on the conveying path to be moved thereon to the binding unit without being turned. The binding unit which operates in a vertical plane at right angles to the conveying path applies a wire or other tying material around the surfaces of the wrapped bale exposed to it, that is to say, the end surfaces covered by the inwardly folded initially tubular ends of the wrapper, as well as the top and bottom surfaces of the bale, said wires or the like crossing the previously applied ties under right angles.

In the accompanying drawings an embodiment of a folding unit according to the invention is shown by way of example. The drawings also illustrate the various steps of the folding process in order to facilitate the description of the operation of the folding unit. Said folding steps are diagrammatically shown in FIGURES 1–4, while FIGURES 5–20 illustrate the construction of the folding unit.

Figures 1, 2, 3:
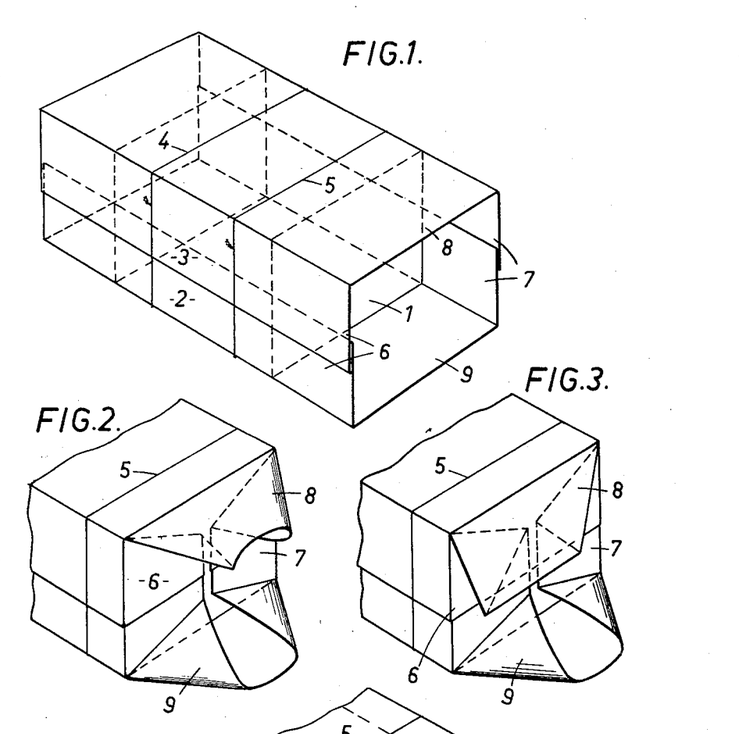
FIGURE 1 is a perspective view of a pulp bale or the like in the partially wrapped state in which the bale is fed to the folding unit, that is to say, with two wrapper sheets covering four adjacent surfaces of the bale and projecting by their tubular ends beyond the remaining or end surfaces of the bale.
FIGURES 2–4 show the various steps of folding a projecting tubular end of the wrapper.

The bale 1 shown in FIGURE 1 is partially wrapped by two sheets 2 and 3 of pulp or a similar material difficult to fold by hand. The lower wrapper sheet 2 covers the bottom surface of the bale with its edges folded upwardly over the lower portions of the side surfaces of the bale. The upper wrapper sheet 3 covers the top surface of the bale with its edges folded downwardly over the upper portions of the side surfaces of the bale. The edges of the upper sheet overlap those of the lower sheet, as shown. The central portion of the tubular wrapper in contact with the four sides of the bale surrounded thereby is secured on the bale by means of a pair of baling wires 4 and 5, as shown. The ends of the wrapper project beyond the remaining or end surfaces of the bale to such an extent, that each wrapper end may cover the respective end surface of the bale completely by folding it inwardly in a manner corresponding to that used in the conventional wrapping of parcels by hand.

Figure 4:
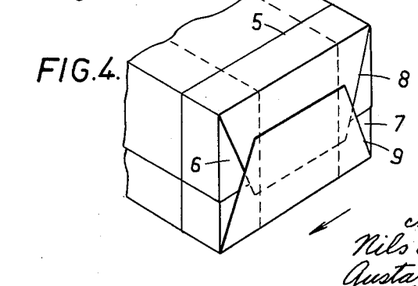

While in the state shown in FIGURE 1 the bale is fed to the folding unit where the inward folding of the projecting wrapper ends is performed in three successive steps. The first folding step involves simultaneous folding of the sides 6 and 7 of the projecting ends of the wrapper over the ends of the bale, as indicated in FIGURE 2. This leaves flaps 8 and 9 projecting outwardly from the top and bottom of each end of the bale. In the second folding step the two top flaps 8 are folded downwardly over the inwardly folded side portions 6 and 7, as shown in FIGURE 3. In the third or last folding step the bottom flaps 9 are folded upwardly over the downwardly folded top flaps 8, as shown in FIGURE 4.

The folding unit illustrated in FIGURES 5 to 20, includes, in part, two folding member carriers, here referred to as "folding heads," provided above the conveying path on opposite sides thereof and each carrying two members for folding the sides 6 and 7 of one end of the wrapper inwardly and a member for folding the top flap 8 of the same end of the wrapper and, in part, two carriages provided on opposite sides of the conveying path on a level therewith, each of said carriages having a member for folding the projecting bottom flap 9 of one end of the wrapper and means for controlling said folding member.

The conveying path on which the bales partially wrapped as shown in FIGURE 1 are moved to the folding unit comprises in the example shown rollers 10 but may, of course, be of any other suitable structure as well. The conveying is assumed, in the example shown, to lead to a binding machine (not shown) for applying baling wires or bands to the completely wrapped bale.

Figure 5:
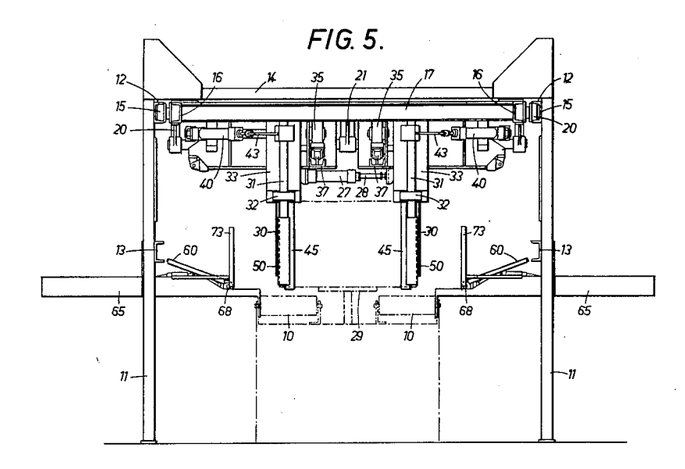
FIGURE 5 is an elevation of the folding unit as seen in the longitudinal direction of a conveying path, above and to the sides of which the folding unit is located.
Figure 8:
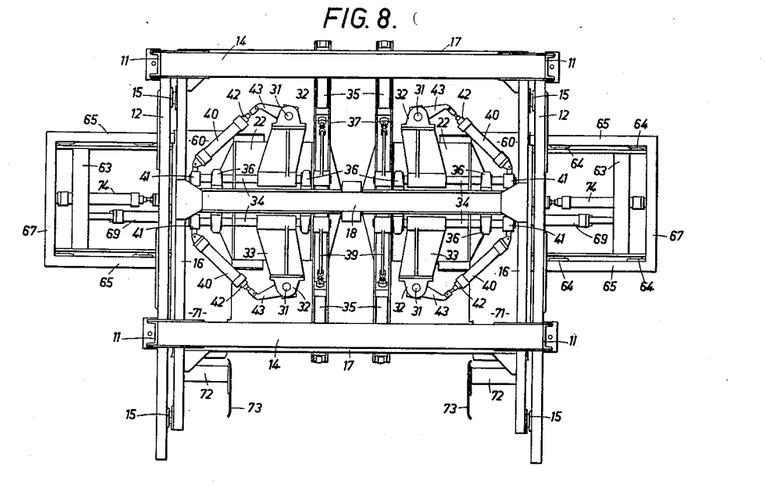
FIGURE 8 is a plan view of the entire folding unit.
Figure 9:
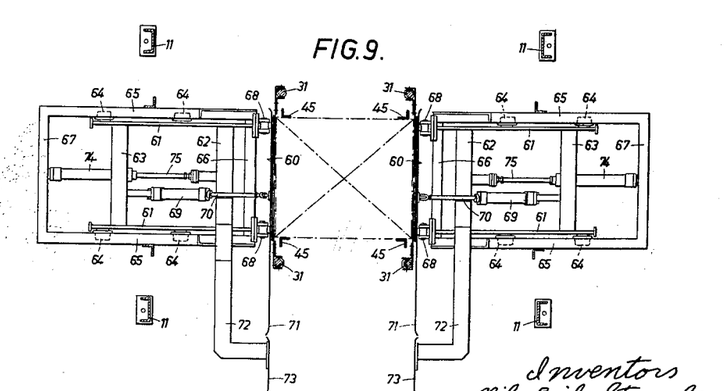
FIGURE 9 is a horizontal section of the folding unit taken on such a level as to show the means for performing the final folding operation in plan view.
Figure 10:
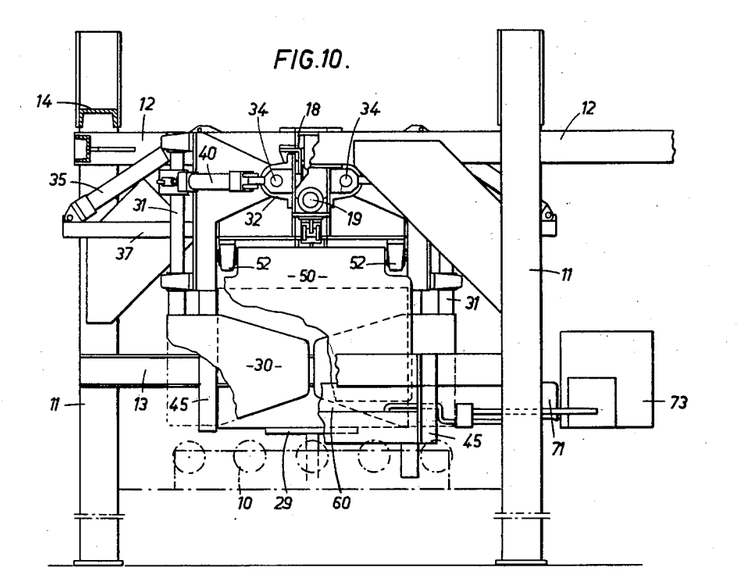
FIGURE 10 is a side elevation of the folding unit with the final folding means removed.

The two folding heads are mounted in a common framework in such a way as to be movable to and from each other in a direction at right angles to the longitudinal direction of the conveying path 10. The framework carrying the folding heads are supported on a suitable level above the conveying path by a supporting structure including four standards 11, see FIGURES 5, 8 and 9, the two of which situated on the same side of the conveying path being connected together at their top ends by U-beams 12 extending parallel with the path 10 which are open at their sides facing said path, and approximately on half their height by similar U-beams 13. The standards situated in register with each other on opposite sides of the conveying path are connected together at their top ends by U-beams 14 extending at right angles to the path 10, one of which is shown in FIGURE 5 and both of which are shown in FIGURE 8.

The upper beams 12 which extend in directions parallel with the conveying path 10 act as rails for rollers 15 for supporting the horizontal framework carrying the two folding heads on a suitable level above the conveying path. In the example shown there are four such rollers 15, two of which being in rolling engagement with each beam 12, as will appear from FIGURE 8. Said horizontal frame comprises longitudinal members 16 parallel with the conveying path 10, transverse members 17 extending at right angles thereto, and a beam 18 parallel with the frame members 17 which is situated midway between the frame members 17, see FIGURE 8. Provided below said central beam 18 is a shaft 19, see FIGURE 6, parallel with said beam 18, that is to say, extending horizontally and transversely with respect to the conveying path. Said shaft 19 is supported at its ends by arms 20 depending from the beams 16 and at its middle portion by an arm 21 depending from the central beam 18. Supported by shaft 19 symmetrically on opposite sides of the central supporting arm 21 are the two folding heads. Each folding head comprises a main body 22, which may move along shaft 19 by means of two rollers 23, as shown in the right hand portion of FIGURE 6, and folding members mounted therein. The body 22 of each folding head is guided laterally by means of rollers 24 engaging the downwardly open U-beam 18 and is held against lifting movement by means of a roller 25 mounted in a transversely extending bridge 26 provided in the body 22. The position of the two folding heads with relation to each other along shaft 19 is controlled by a connection comprising a pneumatic or hydraulic cylinder 27 rigidly connected to the main body of one folding head, viz. the left hand one in FIGURE 6, and the piston rod 28 of which is rigidly connected to the main body of the other folding head.

The folding means carried by the folding heads serve to effect the folding steps illustrated in FIGURES 2 and 3.

A condition that must be satisfied in order to allow these folding operations is that the bale which is fed to the folding unit with the ends of the tubular wrapper facing forwardly and rearwardly in the longitudinal direction of the conveying path must be turned half a revolution after it has reached a central position with respect to the folding heads. To this end there is provided at this point of the conveying path a vertically movable turntable 29 by means of which a bale while in said position may be raised clear of the conveying rollers and turned through an angle of 90° so that the open ends of the wrapper will project outwardly from the sides of the conveying path at right angles thereto.

For folding the sides 6 and 7 of the tubular ends of the wrapper inwardly each folding head is provided with two flat folding members 30, hereinafter referred to as side folding plates, of the profile indicated by dotted lines in FIGURE 7.

Figure 7:
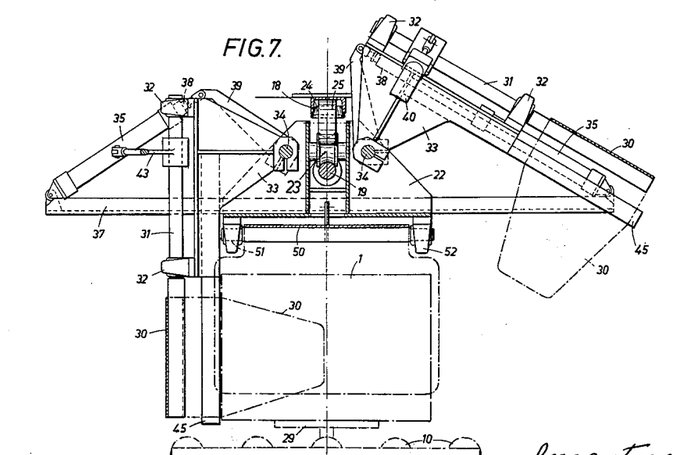
FIGURE 7 is a central vertical section, taken at right angles to the conveying path, of the elements of the folding unit located above said path, with certain parts removed.
Figure 11:
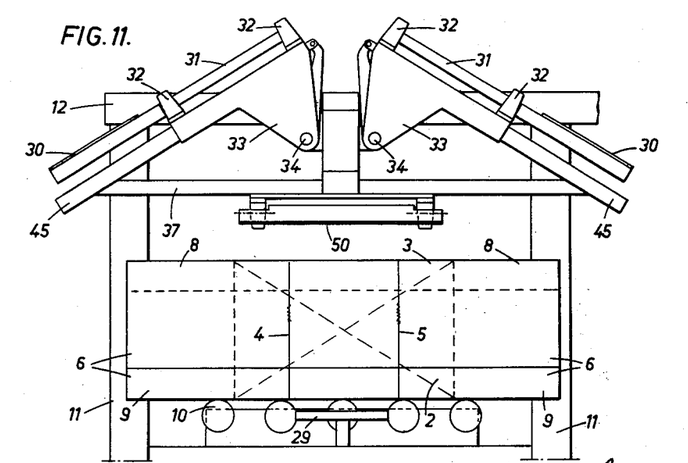
FIGURE 11 is a side elevation of a partially wrapped bale after it has been moved on the conveying path into a position right opposite the folding unit.
Figure 12:
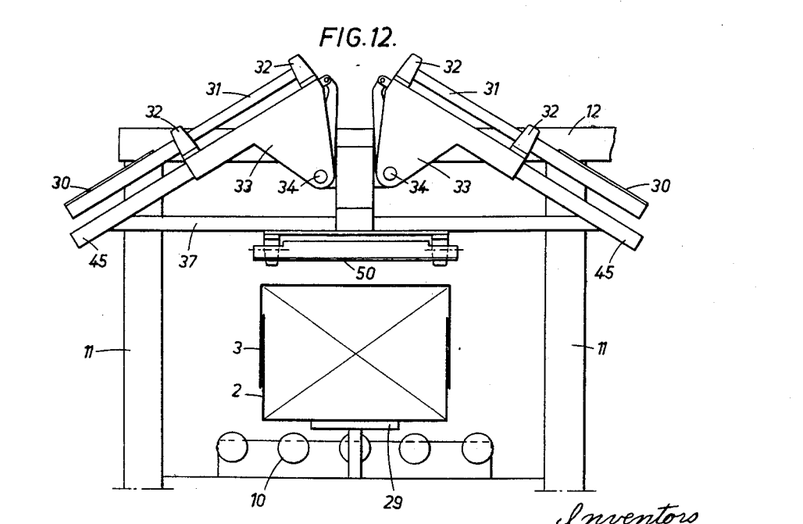
FIGURE 12 is a side elevation of the element shown in FIGURE 11 after raising and turning the bale into a position at right angles to that of FIGURE 11.
Figure 13:
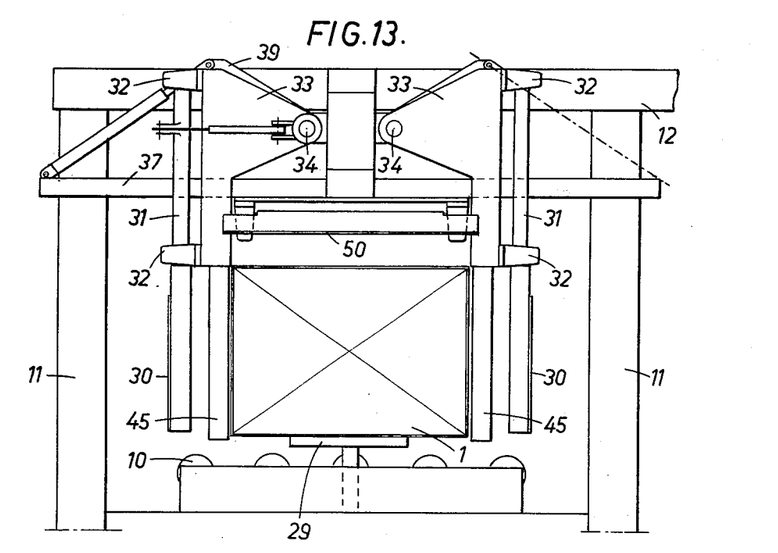
FIGURE 13 is a side elevation of the lateral and upper folding members of the folding unit ready for performing the first folding step.
Figure 14:
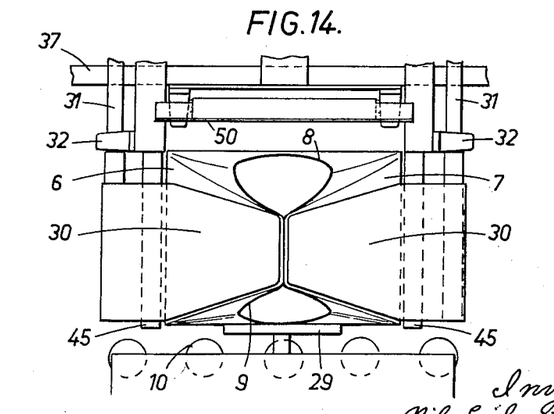
FIGURE 14 is a side elevation of said folding members after completed side folding operation.

Each side folding plate 30 is connected to a shaft 31, see FIGURES 7, 11 and 12, mounted in bearings 32 on a supporting member 33 connected to a shaft 34 extending at right angles to the path 10, said supporting member showing, when seen in a direction at right angles to path 10, substantially the shape of a bell crank lever one arm of which is connected to the shaft 34. There are two such shafts mounted on each folding head, which are symmetrically positioned on opposite sides of a vertical plane extending centrally through the folding head at right angles to the path 10. The two shafts 34 of each folding head are mounted in bearings 36, see FIGURE 8, on the main body 22 of the folding head. The two side folder supporting members 33, hereinafter referred to as brackets assume, while out of operation, the position shown in FIGURES 11, 12 and in the right hand portion of FIGURE 7, in which position said brackets, when seen in a direction at right angles to path 10, are inclined outwardly on opposite sides of a vertical plane extending at right angles to the conveying path through the axis of the turntable so as to present a roof-like formation. From this position the brackets may turn by means of their shafts 34 into a position in which the supporting shafts 31 of the side folding plates 30 project vertically downwardly, as seen in the left hand portion of FIGURE 7. Said turning of the brackets is controlled by pneumatic or hydraulic cylinders 35, see especially left hand portion of FIGURE 7, which are pivotally mounted on the outer ends of a beam 37 projecting outwardly in both directions from the main body 22 of the folding head, see FIGURE 6, the piston rods 38 of which are pivotally connected to arms 39 supported by the shafts 34.

Figure 6:
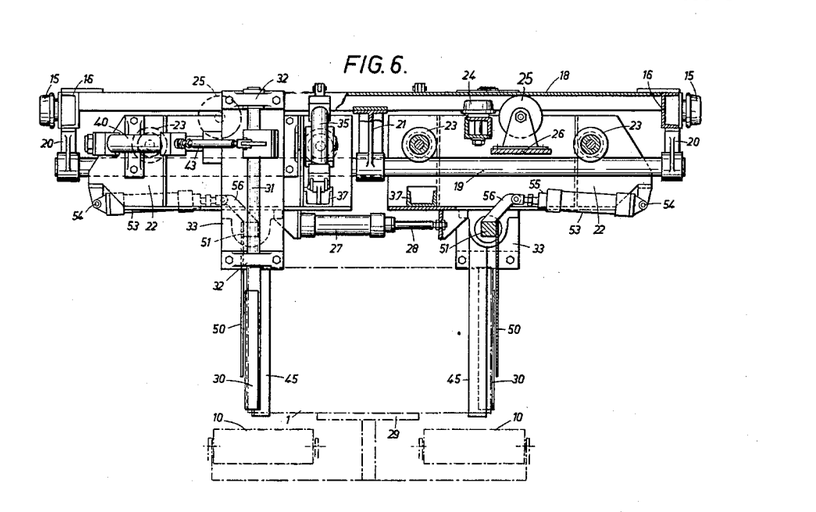
FIGURE 6 is a part sectional elevation of the elements of the folding unit provided above the conveying path looking in the longitudinal direction of said path and shown on a larger scale than that used in connection with FIGURE 5.

The shafts 31 carrying the side folding plates 30 may also be rotated by pneumatic or hydraulic cylinders 40, see especially FIGURES 5, 6 and 8. Said cylinders 40 are pivotally mounted on supporting members 41 secured to the shafts 34, see FIGURE 8, and have their piston rods 42 pivotally connected to arms 43 secured to the shafts 31. It is thus seen that the cylinders 40 together with the brackets 33 partake in the rotary motions of the shafts 34.

The brackets 33 on which the shafts 31 with the side folding plates 30 are mounted also support means for centering the bales during the folding of the ends of the wrapper. Said means comprise arms 45 extending parallel with the shafts 31 below the same and so displaced with relation thereto as not to be a hindrance to the movement of the side folding plates 30, but are arranged with a view to engaging the previously wrapped surfaces of the bale, that is to say, the surfaces of the bale which during the folding of the ends of the wrapper are facing forwardly and rearwardly in the direction of the conveying path, as will appear from FIGURE 9.

In order to effect the folding of the top flaps 8 at the ends of the bale downwardly each folding head is provided with a flat folding member 50, hereinafter referred to as upper folding plate, connected to a shaft 51 parallel with the conveying path 10 which is mounted in bearings 52 secured to the lower surface of the main body 22 of the folding head. The shaft 51 of each folding head may be controlled by a pneumatic or hydraulic cylinder 53, see FIGURE 6, pivotally mounted at the outer end of the main body 22 of the folding head, as shown at 54, the piston rod of which is pivotally connected to an arm 59 projecting upwardly from shaft 51.

The means for effecting the folding of the bottom flaps 9 of the wrapper ends upwardly comprises two carriages arranged on opposite sides of the conveying path 10 which are reciprocable in directions at right angles thereto. Each carriage supports a flat folding member 60, hereinafter referred to as the lower folding plate, as well as controlling means therefor. The carriages comprise each a frame including side members 61, see FIGURE 9, and front and end members 62 and 63, respectively, interconnecting the side members, it being understood that the front end means in this connection the end facing the path 10. Mounted in the side members 61 are supporting wheels 64 which engage rails extending at right angles to the path 10, said rails comprising in the example shown the side members 65 of a stationary frame comprising in addition to said side members also front and rear end members 66 and 67, respectively.

The lower folding plate 60 of each carriage is mounted at the front end of the carriage, viz. the end facing the conveying path 10, to turn on a pivot 68, see FIGURES 5, 9, 17, 18, allowing said folding plate to swing between a substantially horizontal normal position and a vertical working position. This movement is controlled by a pneumatic or hydraulic cylinder 69 pivotally connected to the rear end member 63 of the carriage frame. The piston rod 70 of said cylinder is pivotally connected to a point of the lower folding plate 60 substantially midway between the upper and lower edges thereof.

The lower folding plate 60 is formed with an extension 71 projecting beyond the carriage in the out direction of conveying path to an extent substantially corresponding to the extension of the bale in the longitudinal direction of path 10.

The front end member 62 of the carriage frame is formed with an extension 72 extending in the same direction as the extension 71 of the lower folding plate 60 and to a slightly greater extent than the extension 71. The extreme end of extension 72 is angularly bent towards the path 10 and carries a plate 73 lying in the same vertical plane as the lower folding plate 60 and its extension 71, as the lower folding plate is in its upwardly turned working position. The purpose of this arrangement will be described later.

For moving the carriages towards and away from the conveying path 10 there is provided in each of the stationary frames comprising the elements 65, 66 and 67, the side members 65 of which act as rails for the supporting wheels or rollers 66, a pneumatic or hydraulic cylinder 74 rigidly connected to the rear end member 67 of the stationary frame and having its piston rod 75 connected to the front and member 62 of the frame of the respective carriage.

The pneumatic or hydraulic cylinders included in the construction above described are controlled by automatic means, not shown, to assure that the various operation steps take place in the proper order.

The operation of the folding unit above described is as follows:

As hereinbefore stated, the bale prior to its delivery to the folding unit described has been partially wrapped, as shown in FIGURE 1. While passing along the conveying path to the folding unit the open ends of the tubular wrapper are facing forwardly and rearwardly in the longitudinal direction of the conveying path, as is shown in FIGURE 11. The feeding of the bale is stopped when the bale reaches a central position with relation to the folding unit. By means of the turntable 29 the bale is raised clear of the conveying path and turned through an angle of 90°, so that the open ends of the tubular wrapper will project laterally from the conveying path (the position shown in FIGURE 12).

The brackets 33 in the folding heads are then swung downwardly on their shafts 34 from the position shown in FIGURE 12 into a position in which the schafts 31 and the arms 45 are pointing vertically downwardly, as shown in the left hand portion of FIGURE 7. The arms 45 which in the example shown comprise angle-bars, are brought by this movement into engagement with the surfaces of the bale facing forwardly and rearwardly in the longitudinal direction of the conveying path 10 (that is, the right hand and left hand surfaces in FIGURE 12), thereby centering the folding head above the bale in the longitudinal direction of the conveying path.

In the downwardly directed vertical position of the shafts 31 and the arms 45 above described the side folding plates 30 are positioned in vertical planes at right angles to the longitudinal direction of the conveying path, that is to say, parallel with the sides of the tubular wrapper. In this position the side folding plates 30 are situated at a certain distance from the sides 6 and 7 of the tubular ends of the wrapper. By rotation of the shafts 31 the side folding plates 30 are caused to swing inwardly to the position shown in FIGURE 14 and in doing this the plates 30 will move the sides 6 and 7 to the positions shown in FIGURE 2. By the action of the cylinder 27 the folding heads are then pulled towards each other in the transverse direction of the conveying path 10, thereby firmly pressing the folded sides 6 and 7 of the wrapper ends against the ends of the bale, at the same time locking the bale against displacement in the transverse direction of the path. As a result, the bale is now positively locked against any movement from its centered position. In this position the side folding plates will remain during the subsequent folding steps.

Figure 15:
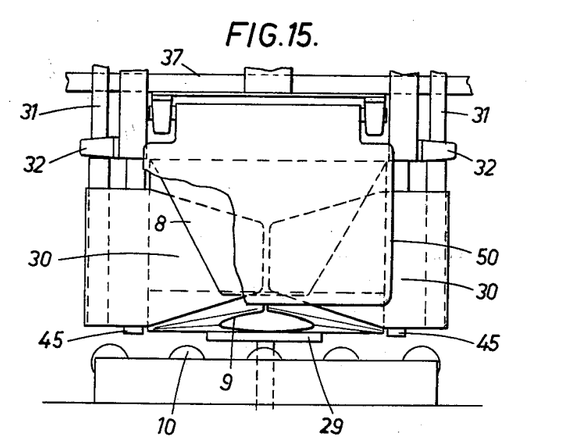
FIGURE 15 is a side elevation of said folding members after completion also of the upper folding operation.
Figure 16:
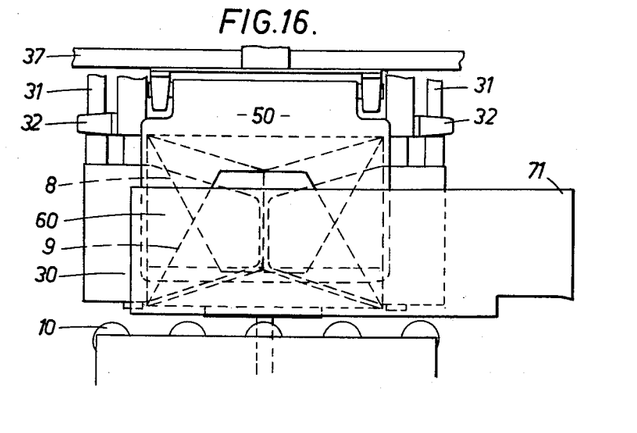
FIGURE 16 is a side elevation of all folding members after completion of their folding operations.

The next folding step is accomplished by turning the upper folding plates 50 under the action of the respective control cylinders 53 to a position in which the normally horizontal upper folding plates 50 assume a downwardly pointing vertical position. During the movement to this position the plates 50 act on the projecting top flaps 8 of the wrapper ends forcing them against the side folding plates 30 which remain in their inwardly swung position, as shown in FIGURE 15, thereby completing the folding process up to the state shown in FIGURE 3. The upper folding plates 50 remain in their downwardly swung position during the remainder of the folding process.

Figure 17:
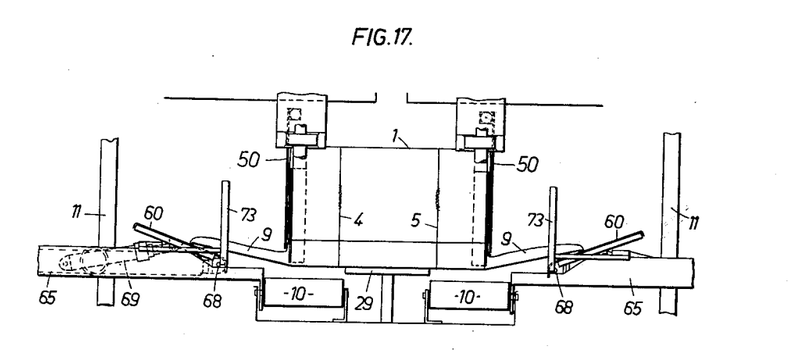
FIGURE 17 is a front elevation of the lower folding members provided by the sides of the conveying path on a level therewith at the beginning of their folding operation.
Figure 18:
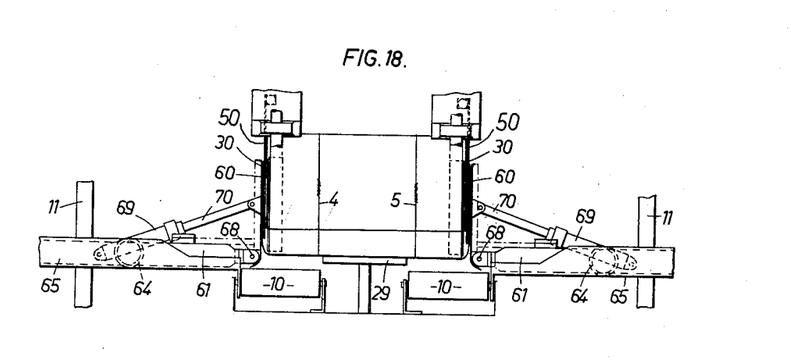
FIGURE 18 shows the same members after completed folding operation.
Figure 19:
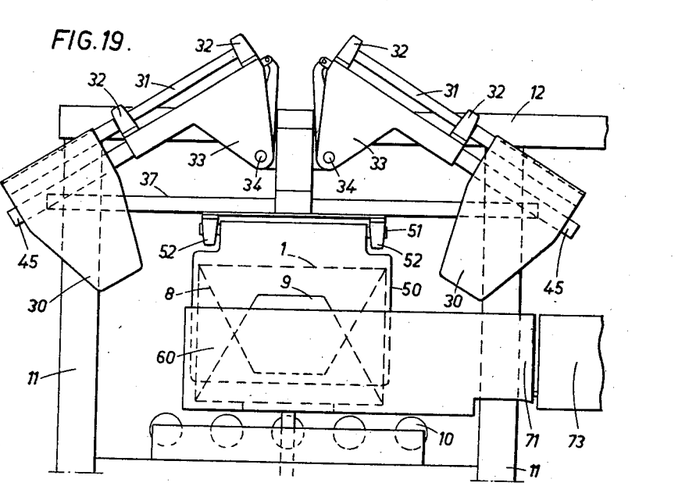
FIGURE 19 shows the lateral folding members after completed folding operation turned up clear of the wrapper of the bale.
Figure 20:
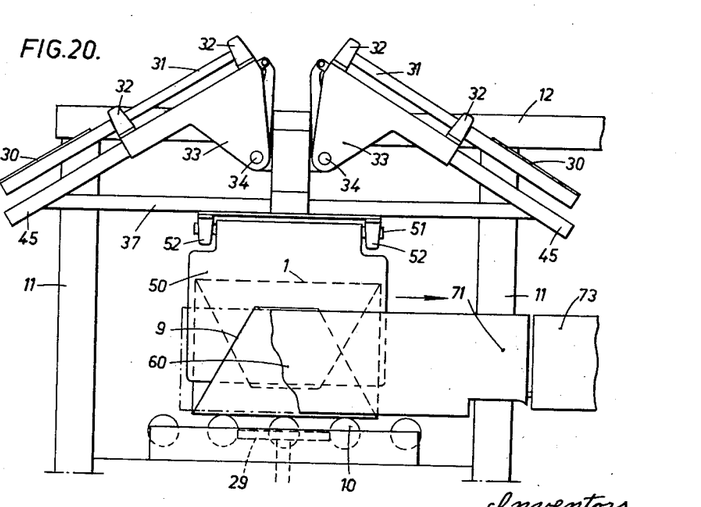
FIGURE 20 shows the same members fully retracted to their normal position.

The folding step then following, viz. folding the bottom flaps 9 at both ends of the bale upwardly, is effected by moving the carriages by the action of the cylinders 74 towards the bale while at the same time swinging the lower folding plates 60 from their normal lowered position, see FIGURE 17, upwardly to a vertical position. In this turning movement the folding plates 60 will press the bottom flaps 9 of the ends of the wrapper to lie flat against the upper folding plates 50, as shown in FIGURE 18. By this action the folding stage shown in FIGURE 4 is attained, yet with the difference that all folding plates are still in their final positions assumed in the course of the folding process, jammed between the various inwardly folded end portions of the wrapper.

Thus, before the wrapped bale can be removed from the folding unit to be transmitted to the binding machine, the folding plates have to be brought out of engagement with the wrapper and the bale then has to be lowered on to the conveying rollers. As a preparation for these procedures the cylinders controlling the side folding plates 30 and the arms 45 as well as the upper folding plates 50 are relieved from pressure. This being accomplished, the ends of the wrapper are held in their inwardly folded position substantially by the lower folding plates 60 which are still subjected to a reduced pressure.

This state having been attained, an impulse is given to the cylinders 55 to cause them to swing the brackets 33 outwardly and upwardly, which may be effected without any hindrance, since the side folding plates 30 will move in vertical planes parallel with the sides of the bale covered with the folded ends of the wrapper. After the side folding plates 30 are free from the bale, see FIGURE 19, the cylinders 40 receive an impulse to turn the shafts 31 into such a position as to restore the side folding plates 30 to their normal position shown in FIGURE 20. While in this position the plates 30 cannot in any way interfere with the removal of the bale from the folding unit.

To this end the bale is lowered on to the conveying path by lowering the turntable. Any rotation of the turntable is not effected at this moment. Thus, the end surfaces of the bale covered by the end portions of the wrapper are facing opposite sides of the conveying path while the bale is moved to the binding machine.

During the first portion of said movement the upper and lower folding plates 50 and 60 remain in their positions. This is possible owing to the fact that said plates cannot prevent the movement of the bale because they are positioned in vertical planes parallel with the direction of movement of the bale so that they may still hold the ends of the wrapper in their folded positions. After the bale has left the upper folding plates, the ends of the wrapper are held in their folded positions under the action of the extensions 71 of the lower folding plates and the additional guide plates 73. According as the bale is removed from the guide plates 73 it enters the binding machine, not shown, where tying material is applied around the bale before the bale is completely out of engagement with the guide plates.

Then the carriages and the lower folding plates 60 are restored to starting position, thereby allowing the upper folding plates to be swung upwardly.

The folding unit is now restored to its starting position ready for performing another series of folding operations.

It is to be noted that the construction above described is to be considered as an example of the invention only. As regards details modifications of different kinds may be made without departing from the principle or scope of the invention.

Thus, for instance, the centering means which in the example shown comprise arms 45 may be replaced by rollers mounted on arms connected to the shafts 31.

Instead of pneumatic or hydraulic cylinders for controlling the operation of the folding unit, mechanical control means may be used.

It is further to be noted that the folding unit may be employed even if only one projecting end of a tubular wrapper is to be folded. In such case the unnecessary folding members may either be disconnected or allowed to run idle according to circumstances.

The sequence of operation of the various folding members is not limited to that above described. For instance, instead of folding the projecting bottom flaps in the last step of operation, the last step may involve folding the top flaps downwardly.

We claim:

1. An apparatus for completing the folding of a wrapper around a bundle partially wrapped previously by an upper wrapping sheet and a lower wrapping sheet covering the top and bottom surface of the bundle, respectively, and overlapping by their edges along the side surfaces of the bundle and projecting beyond the end surfaces thereof by tubular ends, comprising a conveying path for directing the bundle to the folding apparatus, a pair of upper carriers provided on a level above said path on opposite sides thereof, each upper carrier comprising a main body and two brackets connected thereto by parallel horizontal pivots, a vertically adjustable turntable provided in said path centrally with respect to said upper carriers for raising the bundle clear of the conveying path and turning it so as to have its ends facing the upper carriers, two members pivotally mounted on each upper carrier for folding the vertical sides of the wrapper end facing the carrier towards the respective end surface of the bundle, said two members comprising plates each supported by an individual one of said brackets by being secured to a shaft rotatably mounted on said bracket in such a way as to have its axis situated in a vertical plane at right angles to the axis of the bracket, so that the side folding plate may be turned between a position at right angles to said vertical plane and a position parallel therewith for allowing it to perform its folding operation, means mounted on the main bodies of the upper carriers for folding the top projecting ends of the wrapper against the bundle ends, and means provided on the opposite sides of the conveying path for folding the bottom projecting ends of the wrapper against the bundle ends.

2. An apparatus for completing the folding of a wrapper around a bundle partially wrapped previously by an upper wrapping sheet and a lower wrapping sheet covering the top and bottom surfaces of the bundle, respectively, and overlapping by their edges along the side surfaces of the bundle and projecting beyond the end surfaces thereof by tubular ends, comprising a conveying path for directing the bundle to the folding apparatus, a pair of upper carriers provided on a level above said path on opposite sides thereof, each upper carrier comprising a main body and two brackets connected thereto by parallel horizontal pivots, a vertically adjustable turntable provided in said path centrally with respect to said upper carriers for raising the bundle clear of the conveying path and turning it so as to have its ends facing the upper carriers, two members pivotally mounted on each upper carrier for folding the vertical sides of the wrapper end facing the carrier towards the respective end surface of the bundle and a third member pivoted to each upper carrier for folding the top of one projecting end of the wrapper downwardly towards the previously folded sides of said wrapper end, said third or top folding member on each upper carrier comprising a plate pivoted to said main body by means of a horizontal shaft extending at right angles to the vertical planes through the axes of said pivots, thereby allowing turning of said plate between a horizontal starting position on a level above a bundle undergoing wrapping and a vertical depending final position, a pair of lower carriers located on opposite sides of the turntable on a level with the conveying path, and a member pivotally supported by each lower carrier for folding the bottom of one projecting wrapper end upwardly towards the previously folded side and top portions of the respective wrapper end.

3. An apparatus for completing the folding of a wrapper around a bundle partially wrapped previously by an upper wrapping sheet and a lower wrapping sheet covering the top and bottom surfaces of the bundle, respectively, and overlapping by their edges along the side surfaces of the bundle and projecting beyond the end surfaces thereof by tubular ends, comprising a conveying path for directing the bundle to the folding apparatus, a pair of upper carriers provided on a level above said path on opposite sides thereof, a vertically adjustable turntable provided in said path centrally with respect to said upper carriers for raising the bundle clear of the conveying path and turning it so as to have its ends facing the upper carriers, two members pivotally mounted on each upper carrier for folding the vertical sides of the wrapper end facing the carrier towards the respective end surface of the wrapper, a member pivotally mounted on each upper carrier for folding the respective top projecting ends of the wrapper downwardly towards the previously folded sides of said wrapper end, stationary frames on opposite sides of the conveying path, a carriage mounted in each frame to move towards and away from the conveying path in directions at right angles thereto, pressure fluid operable power cylinders mounted in said frames for controlling said movements, plates pivotally supported by said carriages for folding the bottoms of the projecting wrapper ends upwardly towards the previously folded side and top portions of the wrapper ends, and extensions formed on said plates for guiding the end surfaces of the completely wrapped bundle during the removal of the bundle from the folding apparatus.

4. An apparatus for completing the folding of a wrapper around a bundle partially wrapped previously by an upper wrapping sheet and a lower wrapping sheet covering the top and bottom surfaces of the bundle, respectively, and overlapping by their edges along the side surfaces of the bundle and projecting beyond the end surfaces thereof by tubular ends, comprising a conveying path for directing the bundle to the folding apparatus, a pair of upper carriers provided on a level above said path on opposite sides thereof, a vertically adjustable turntable provided in said path centrally with respect to said upper carriers for raising the bundle clear of the conveying path and turning it so as to have its ends facing the upper carriers, two members pivotally mounted on each upper carrier for folding the vertical sides of the wrapper end facing the carrier towards the respective end surface of the wrapper, a member pivotally mounted on each upper carrier for folding the respective top projecting ends of the wrapper downwardly towards the previously folded sides of said wrapper end, stationary frames on opposite sides of the conveying path, a carriage mounted in each frame to move towards and away from the conveying path in directions at right angles thereto, pressure fluid operable power cylinders mounted in said frames for controlling said movements, plates pivotally supported by said carriages for folding the bottoms of the projecting wrapper ends upwardly towards the previously folded side and top portions of the wrapper ends, extensions formed on said plates for guiding the end surfaces of the completely wrapped bundle during the removal of the bundle from the folding apparatus, and stationary guide plates provide on the carriages on a line with said folding plates and their extensions for taking over the guidance of the end surfaces of the bundle on its further way to a binding machine.

5. An apparatus for completing the folding of a wrapper around a bundle partially wrapped previously by an upper wrapping sheet and a lower wrapping sheet covering the top and bottom surfaces of the bundle, respectively, and overlapping by their edges along the side surfaces of the bundle and projecting beyond the end surfaces thereof by tubular ends, comprising a conveying path for directing the bundle to the folding apparatus, a pair of upper carriers provided on a level above said path on opposite sides thereof, each such carrier comprising a main body and two brackets connected thereto by parallel horizontal pivots, a vertically adjustable turntable provided in said path centrally with respect to said upper carriers for raising the bundle clear of the conveying path and turning it so as to have its ends facing the upper carriers, two members each pivotally mounted on each upper carrier for folding the vertical sides of the wrapper end facing the carrier towards the respective end surface of the bundle, said two members comprising plates each supported by an individual one of the two brackets of the respective carrier by being secured to a shaft rotatably mounted on the bracket in such a way as to have its axis situated in a vertical plane at right angles to the axis of the bracket, so that the side folding plate may be turned between a position at right angles to said vertical plane and a position parallel therewith for allowing it to perform its folding operation, a common frame for supporting the pair of upper carriers which are movable therein towards and away from each other in a direction at right angles to the longitudinal direction of the conveying path, means for causing the upper carriers to press the side folding plates supported thereby against the bundle and hold them there during the folding of the top and bottom portions of the projecting wrapper ends, plates pivoted to the main bodies of the upper carriers to swing about horizontal axes for folding the top projecting ends of the wrapper downwardly against the ends of the bundle, means provided on opposite sides of the conveying path for folding the bottom projecting ends of the wrapper upwardly against the ends of the bundle and means on said brackets for centering the folding apparatus in respect of a direction at right angles to the direction in which the bundle is held by means of the side folding plates.

References Cited in the file of this patent
UNITED STATES PATENTS 2,584,529     Allen ____________________ Feb. 5, 1952
2,858,657     Guthrie __________________ Nov. 4, 1958